May 23, 1933.  J. F. LEVENTHAL  1,910,995
SYNCHRONIZING DEVICE FOR MOTION PICTURE APPARATUS
Filed March 8, 1930
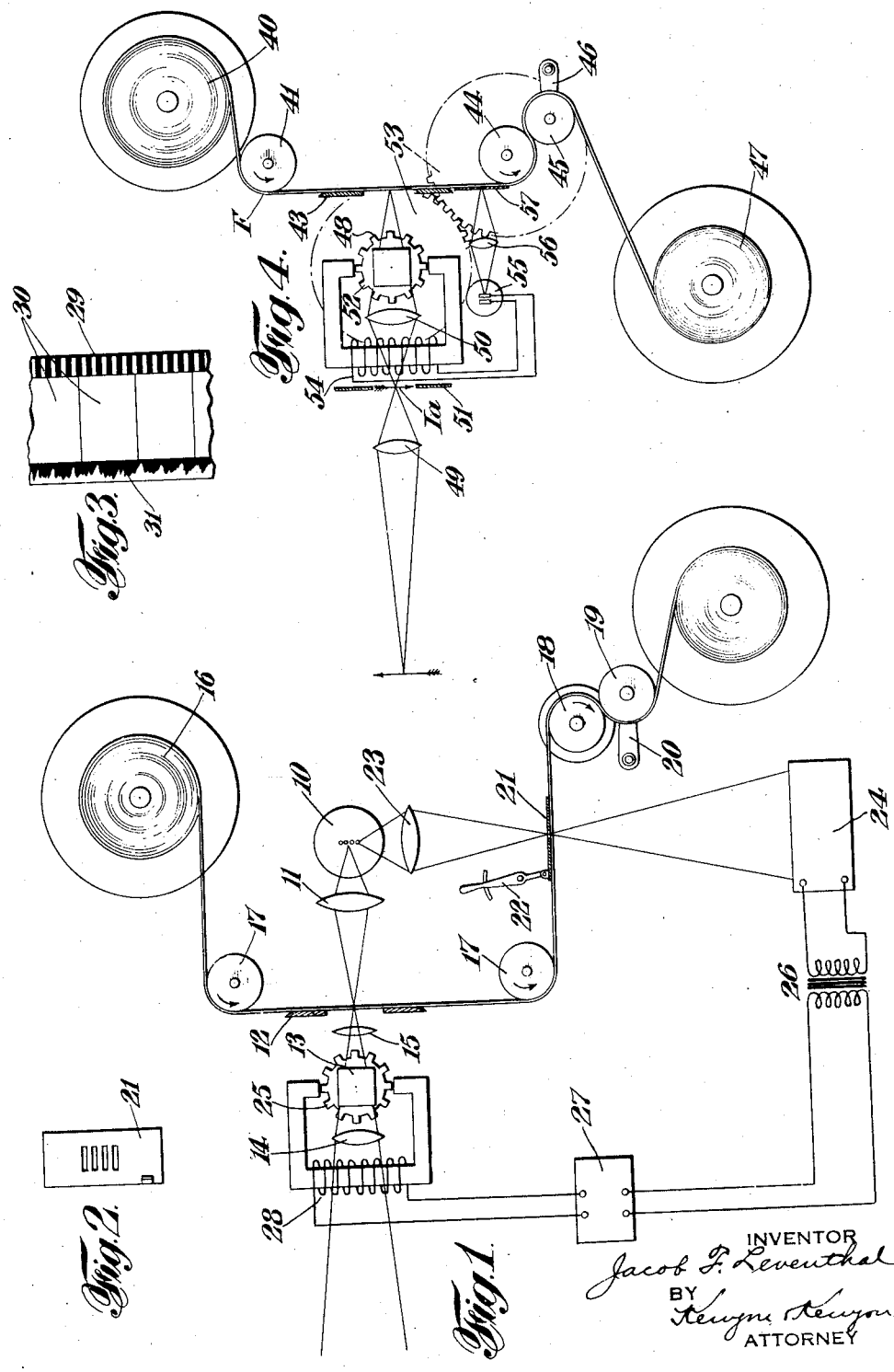

Patented May 23, 1933

1,910,995

UNITED STATES PATENT OFFICE

JACOB F. LEVENTHAL, OF NEW YORK, N. Y., ASSIGNOR TO THE FIRST NATIONAL BANK OF CHATTANOOGA, OF CHATTANOOGA, TENNESSEE, TRUSTEE

SYNCHRONIZING DEVICE FOR MOTION PICTURE APPARATUS

Application filed March 8, 1930. Serial No. 434,243.

This invention relates to film feeding mechanism for motion picture projectors or cameras.

In motion picture apparatus using a rotating optical compensator in conjunction with a film fed at uniform velocity the use of a sprocket wheel and perforations in the film for effecting film feed is accompanied by several objectionable features. In order to obtain uniform velocity of film feed, it is necessary that the perforations spacing match the pitch of the sprocket wheel. Otherwise, the velocity of the film will vary slightly even though the sprocket be rotated at uniform velocity. A motion picture film is subject to shrinkage, so that while, when new, the perforations may be properly spaced to match the sprocket pitch, yet, after a period, spacing of the apertures will no longer exactly match the pitch of the sprocket wheel and the film will be advanced with a jerky movement which will prevent perfect synchronization between the film and the compensator.

An object of this invention is to synchronize photo-electrically the linear velocity of the film and the rotational velocity of the compensator whereby the effect of film shrinkage is avoided.

In a projection apparatus embodying this invention, the film is advanced at uniform velocity and the compensator is driven by a motor which is caused to rotate by means of electrical impulses produced through the medium of a photo-electrical cell, which is energized by light traversing transparent spaces provided along the edge of the film at uniform intervals. The only effect of film shrinkage is to reduce the height of the pictures. There is no possibility of faulty synchronization. The reduction in height of the pictures may be taken care of by utilizing an adjustable magnification compensating system. The spaces may be produced on the film at the time that the pictures are taken and these spaces are formed through the medium of a glow lamp which is energized at constant frequency by means of a generator rotated in synchronism with the film feeding means. Obviously, such electrical synchronizing means may be employed in connection with motion picture projectors or cameras of the type in which the film is fed intermittently. In such case, the uniformly rotating portion of the intermittent mechanism will be synchronized with a section of the film moving at uniform speed. The film will be of the usual perforated type and sprockets will be used to effect feeding of the film. Picture registration will be produced in the usual manner by means of intermittent pull-down mechanism provided with claws or the like to engage the perforations.

Other objects, novel features and advantages of this invention will be apparent from the following specification and accompanying drawing, wherein:

Fig. 1 is a diagrammatic section of a motion picture projector embodying the invention.

Fig. 2 is a plan view of the grid shown in Fig. 1.

Fig. 3 is a view of a section of film, and

Fig. 4 is a diagrammatic section of a camera embodying the invention.

The motion picture projector disclosed in Fig. 1 comprises a projection lamp 10 and a condensing lens 11 which brings to a focus on the film F light from the lamp 10. The film F passes over a gate 12 and is fed at a constant velocity by means later to be described. In front of the aperture 12 there is provided a rotatable optical compensator 13, which may be of the type disclosed in the co-pending application of J. F. Leventhal, Serial No. 217,485, filed September 3, 1927. An objective lens 14 is provided and there is also provided an adjustable lens 15 which coacts with the objective lens 14 to form an adjustable magnification compensating system.

The film F passes from a supply reel 16 over a pair of guide rollers 17 which are located on opposite sides of the aperture 12. From the second guide roller 17, the film passes to a draw-off or feed roller 18 which is driven at constant rotational velocity by any suitable means. A friction roller 19 is carried by the pivoted arm 20 cooperates with the roller 18 to effect positive feeding of the film F. Between the second roller 17 and the roller 18 a grid 21 overlies the film F and is mounted for slidable adjustment longitudinally of the film. This adjustment is effected by the lever 22. A condensing lens 23 focuses light from the lamp 10 on the film F, the light beam being intercepted by the grid 21. Behind the film there is provided a photo-electric cell or the like 24 and the beam of light after passing through the film strikes this cell.

The compensator 13 is mounted on the same shaft with the armature 25 of a synchronous motor. The photo-electric cell 24 is inductively connected through a transformer 26 with the input of an amplifier 27. The output of the amplifier 27 is connected with the field winding 28 of the synchronous motor.

As shown in Fig. 3, the film F is provided along one edge with a series of transverse uniformly spaced similar transparent lines or spaces 29, together with successive picture areas 30. This film may also be provided with a sound track 31. The series of lines 29 pass beneath line-like apertures in the grid 21 and produce variations in the intensity of the light transmitted to the photo-electric cell 24. The variations in the intensity of the light beam results in the production of electric impulses by the photo-electric cell 24. These impulses are converted into alternating current by the transformer 26 and after being amplified by the amplifier 27 are utilized to effect rotation of the armature 25. The lines 29 are so spaced that the impulses cause the compensator 13 to rotate in synchronism with the linear movement of the film F. Slight variations in phase between the film and the compensator may be effected by changing the position of the grid 21 so that the film and compensator may be kept in step.

The lines 29 are produced simultaneously with the taking of the pictures 30.

In the camera disclosed in Fig. 4, 40 is a supply reel from which the film F is drawn over the guide roll 41 and past the aperture in the gate 43 by means of a feed roller 44, driven at uniform velocity by any suitable means. A friction roller 45 supported by the pivoted arm 46 cooperates with the roller 44 to insure positive feeding of the film and 47 is a take-up reel which is driven in any suitable manner at the proper speed to take up the film from the feed roll 44.

In the front of the gate 43 there is provided a rotatable optical compensator 48. A lens 49 produces an aerial image I of the object O and this image is focused by a lens 50 on the film F. A mask 51 limits the exposure of the film to a single picture area.

The compensator 48 is mounted on the same shaft with the armature 52 of a generator which is driven by a suitable gear train 53 in synchronism with the roller 44.

The field winding 54 of the generator is connected with the electrodes of a glow lamp 55, which is focused on the filament F by a lens 66. A mask 57 having a narrow slit permits exposure of only a narrow line of filament to the light from the lamp 55.

The film is advanced at a constant velocity by the feed roller 44 and the compensator 48 is caused to rotate in synchronism with the film. The rotation of the armature 52 produces impulses which are effective to cause flashing of the glow lamp 55. Successive portions of the film F are thus exposed and on development of the film the lines 29, previously referred to, are produced. When the film is run through the projector disclosed in Fig. 1, the lines 29 will control rotation of the compensator 13 so that the film and compensator 13 are in perfect synchronism. This condition will exist even though the film should shrink because both the film and the compensator will operate at steady uniform velocity.

It is of course to be understood that various modifications may be made in the apparatus above described, without in any way departing from the spirit of the invention as defined in the appended claims.

I claim:

1. In combination, a rotatable optical compensator, a motion picture film having a series of uniformly spaced similar light apertures, film feeding means, optical means for directing a light beam through said film and compensator, a synchronous motor for driving said compensator, photo-electric means for providing electric impulses for said motor, and means directing a beam of light through said apertures to said photo-electric means.

2. In combination, a rotatable optical compensator, a motion picture film having a series of uniformly spaced similar light apertures, a synchronous motor for driving said compensator, photo-electric means electrically connected to said motor, a light source, and means to feed said film between said light source and said photo-electric means and between said light source and said compensator.

3. In combination, a rotatable optical compensator, a synchronous motor having driving connection therewith, photo-electric means connected to said motor to supply driving impulses thereto, means to feed a film in front of said photo-electric means and said optical compensator, said film being provided throughout substantially its entire length with alternating transparent and opaque similar and regularly spaced sections, and means for directing a beam of light to said photo-electric means transverse to the path of said sections and a beam of light through said film to said compensator.

4. In combination, a rotatable optical compensator, a synchronous motor for driving said compensator, photo-electric means for providing electric impulses to said motor, a film, means to advance said film past said compensator and said photo-electric means, means for directing light through said film to said optical compensator and said photo-electric means and means on said film for periodically interrupting the light beam supplied to said photo-electric means.

5. In combination, a rotatable optical compensator, a synchronous motor for driving said compensator, photo-electric means for providing electrical impulses to said motor, a light source, a film interposed between said light source and photo-electric means and between said light source and optical compensator, and means for feeding said film, said film having means for periodically interrupting the light beam projected to said photo-electric means.

6. In combination, a rotatable optical compensator, a synchronous motor having driving connection therewith, photo-electrical means connected to said motor to supply energizing impulses thereto, means for directing a beam of light to said photo-electric means and a beam of light to said compensator, and means to feed a film transverse of said light beams, said film being provided throughout substantially its entire length with means for periodically interrupting the light beam supplied to said photo-electric means.

In testimony whereof, I have signed my name to this specification.

JACOB F. LEVENTHAL.